United States Patent
Golden et al.

(10) Patent No.: US 8,734,571 B2
(45) Date of Patent: May 27, 2014

(54) PURIFICATION OF AIR

(75) Inventors: Christopher Timothy Golden, Nantes (FR); Mohammad Ali Kalbassi, Weybridge (GB); Christopher James Raiswell, Crewe (GB); Christine Waweru, Manchester (GB); Michaela Pollock, Surbiton (GB)

(73) Assignee: Air Products and Chemicals, Inc., Allentown, PA (US)

( * ) Notice: Subject to any disclaimer, the term of this patent is extended or adjusted under 35 U.S.C. 154(b) by 180 days.

(21) Appl. No.: 13/484,830

(22) Filed: May 31, 2012

(65) Prior Publication Data
US 2013/0319228 A1    Dec. 5, 2013

(51) Int. Cl.
*B01D 53/047*    (2006.01)
*B01D 53/04*    (2006.01)

(52) U.S. Cl.
CPC .......... *B01D 53/0462* (2013.01); *B01D 53/047* (2013.01); *B01D 2253/1085* (2013.01); *B01D 2257/402* (2013.01); *B01D 2257/504* (2013.01); *B01D 2259/4146* (2013.01)
USPC ...................... 95/97; 95/106; 95/129; 95/139

(58) Field of Classification Search
CPC ............ B01D 53/0462; B01D 53/047; B01D 2253/104; B01D 2253/108; B01D 2253/1085; B01D 2257/402; B01D 2257/504; B01D 2257/80; B01D 2259/4145; B01D 2259/4146
USPC ......... 95/96, 97, 99, 106, 117, 121–123, 129, 95/139
See application file for complete search history.

(56) References Cited

U.S. PATENT DOCUMENTS

| 4,249,915 | A | 2/1981 | Sircar et al. |
| 4,472,178 | A | 9/1984 | Kumar et al. |
| 4,541,851 | A | 9/1985 | Bosquain et al. |
| 4,711,645 | A | 12/1987 | Kumar |
| 5,137,548 | A | 8/1992 | Grenier et al. |
| 5,232,474 | A | 8/1993 | Jain |

(Continued)

FOREIGN PATENT DOCUMENTS

EP    0 992 274 A1    4/2000

OTHER PUBLICATIONS

Dr. Ulrich von Gemmingen, Designs of Adsorptive Dryers in Air Separation Plants, Reports on Science and Technology, 54/1994, Linde, pp. 8-12.

(Continued)

*Primary Examiner* — Frank Lawrence, Jr.
(74) *Attorney, Agent, or Firm* — Eric J. Schaal

(57) ABSTRACT

Reduction of water, $CO_2$ and $N_2O$ in an air stream comprising: passing said air stream at a feed temperature through a first adsorbent, whose Henry's Law selectivity for $CO_2/N_2O$ is at least 12.5, and a second adsorbent, whose Henry's Law constant for $CO_2$ is less than 1020 mmol/g/atom and whose Henry's Law selectivity for $CO_2/N_2O$ is at most 5; and passing a heated regenerating gas at a temperature which is between 20° C. and 80° C. to at least the second adsorbent, and passing a second regenerating gas at a temperature less than the temperature of the heated regenerating gas to the first and second adsorbents in a direction opposite to the feed direction; the second adsorbent occupying from 25% to 40% of the total volume of the adsorbents, and the temperature of the heated regenerating gas being 10° C. to 60° C. higher than the feed temperature.

13 Claims, 7 Drawing Sheets

(56) References Cited

U.S. PATENT DOCUMENTS

| | | |
|---|---|---|
| 5,614,000 A | 3/1997 | Kalbassi et al. |
| 5,656,064 A | 8/1997 | Golden et al. |
| 5,846,295 A | 12/1998 | Kalbassi et al. |
| 5,855,650 A | 1/1999 | Kalbassi et al. |
| 5,919,286 A | 7/1999 | Golden et al. |
| 6,106,593 A | 8/2000 | Golden et al. |
| 6,719,827 B2 * | 4/2004 | Golden et al. ............... 95/120 |
| 6,723,155 B2 * | 4/2004 | Weyrich et al. ............... 95/120 |
| 6,824,588 B2 * | 11/2004 | Nakamura et al. ............ 95/117 |
| 7,632,337 B2 * | 12/2009 | Howard et al. ................ 95/41 |
| 2006/0000354 A1 | 1/2006 | Henzler et al. |
| 2006/0162556 A1 | 7/2006 | Ackley et al. |

OTHER PUBLICATIONS

C. W. Skarstrom, Heatless Fractionation of Gases Over Solid Adsorbents, vol. 11, 95, N.W. Li(Ed), CRC Press, Cleveland, Ohio 1972.

U. Wenning, Nitrous Oxide in Air Separation Plants, Proceedings from MUST 96, pp. 79-89.

* cited by examiner

PURIFICATION OF AIR

BACKGROUND OF THE INVENTION

The invention relates to the removal of water, carbon dioxide and nitrous oxide, and optionally also hydrocarbons, from an air stream prior to cryogenic air separation.

The cryogenic separation of air requires a pre-purification step for the removal of both high-boiling and hazardous materials. Principal high-boiling air components include water and carbon dioxide. If removal of these impurities from ambient feed air is not achieved, then water and carbon dioxide will freeze out in cold sections of the separation process, such as heat exchangers and the LOX sump. This will cause pressure drop, flow variations and operational problems. Various hazardous materials have also to be recovered including acetylene and other hydrocarbons. The high boiling hydrocarbons, if not removed, will concentrate in the LOX section of the column, resulting in a potential explosive hazard.

It is known that oxides of nitrogen should be removed also. A minor air component is nitrous oxide $N_2O$, which is present in ambient air at about 0.3 ppm. It has similar physical properties to carbon dioxide and therefore presents a potential operation problem because of solids formation in the column and heat exchangers of the cryogenic distillation apparatus. In addition, nitrous oxide is known to enhance combustion of organic materials and is shock sensitive. As such, nitrous oxide also presents a safety hazard. Hydrocarbons such as ethylene, acetylene, butane, propylene and propane are further impurities which are desirably removed prior to cryogenic air separation.

The pre-purification of air is usually conducted by adsorptive clean up processes. These may operate by thermal swing adsorption (TSA) as described in U.S. Pat. Nos. 4,541,851 and 5,137,548 or U. Gemmingen ("Designs of Adsorptive Driers in Air Separation Plants" Reports on Technology 54/1994, Linde), by pressure swing adsorption (PSA) as described in U.S. Pat. Nos. 4,711,645, 5,232,474 or C. W. Skarstrom ("Heatless Fractionation of Gases over Solid Adsorbents" vol II, 95, N. W. Li (Ed), CRC Press, Cleveland, Ohio 1972), or by variants of those processes such as thermally enhanced PSA (TEPSA) as described in U.S. Pat. No. 5,614,000 or TPSA as described in U.S. Pat. No. 5,855,650.

In general, pre-purification of air is carried out by adsorption of contaminating gas components from the air by adsorption on a solid adsorbent with periodic regeneration of the adsorbent. In such methods, the air is fed in contact with at least two layers of solid adsorbents to adsorb the components to be removed, the concentration of which components gradually increases in the adsorbents. The concentration of each of the removed gas components in the adsorbent will not be uniform but will be highest at the upstream end of the adsorbent bed and will tail off progressively through a mass transfer zone in the adsorbent. If the process is conducted indefinitely, the mass transfer zone will progressively move downstream in the adsorbent bed until the component which is to be removed breaks through from the downstream end of the bed. Before this occurs, it is necessary to regenerate the adsorbent.

In pressure swing adsorption (PSA) systems, this is done by stopping the flow into the adsorbent of the gas to be treated, depressurising the adsorbent and, usually, by passing a flow of a regenerating gas low in its content of the component adsorbed on the bed through the bed counter-current to the product feed direction. As the component which is being removed is adsorbed while the bed is on-line, the adsorption process will generate heat of adsorption causing a heat pulse to progress downstream through the adsorbent. During the regeneration process, heat must be supplied to desorb the gas component which has been adsorbed on the bed. In PSA, one aims to commence regeneration before the heat pulse has reached the downstream end of the bed; the direction of travel of the heat pulse is reversed by the counter-current flow of the regenerating gas and the heat derived from the adsorption of the gas component in question is used for desorbing that component during regeneration. One thus avoids having to supply heat during the regeneration step. However, the short cycle time (feed time of typically 10-15 min) used in order to avoid the heat pulse leaving the adsorbent bed requires frequent depressurisation of the bed, during which the feed gas is vented off and lost ("switch loss"). In addition, it is usual to use two adsorbent beds, with one being on-line while the other is regenerated. The depressurisation and regeneration of one bed must take place during the short time for which the other bed is on-line, and rapid repressurisation can lead to transient variations in the feed and product flows which can adversely affect plant operation.

An alternative procedure is known as temperature swing adsorption (TSA). In TSA, the cycle time is extended (feed time of typically 2-12 h) and the heat pulse mentioned above is allowed to proceed out of the downstream end of the adsorbent bed during the feed or on-line period. To achieve regeneration, it is therefore necessary to supply heat to desorb the adsorbed gas component. To this end, the regenerating gas used is heated for a period to produce a heat pulse moving through the bed counter-current to the normal feed direction. This flow of heated regenerating gas is usually followed by a flow of cool regenerating gas which continues the displacement of the heat pulse through the bed towards the upstream end. TSA is characterised by an extended cycle time as compared to PSA. TSA is energy intensive because it is necessary to supply regenerating gas heated to a high temperature such as 150-200° C. in order to ensure desorption of the more strongly adsorbed component from the bed. It is usual also to pre-cool the air to be treated in order to minimise the amount of water that must be adsorbed on the bed, further increasing plant and energy costs.

In a typical air pre-purification TSA method, a two-layer bed is employed to remove essentially all of the water and carbon dioxide present in the feed air stream. Since water is the more strongly adsorbed of the two species, the beds are usually run until carbon dioxide starts to break through the adsorbent bed. More $CO_2$ than $N_2O$ is present in the feed air stream, but since 13X has a larger capacity for $CO_2$ than for $N_2O$, if the beds are run to $CO_2$ breakthrough, significant amounts of $N_2O$ will break through from the bed, and may cause problems downstream in the cryogenic distillation plant.

U.S. Pat. Nos. 4,249,915 and 4,472,178 disclose an adsorption process in which moisture and carbon dioxide are removed from atmospheric air by adsorption in separate respective beds. The moisture laden bed is regenerated by PSA in a relatively short operating cycle, while the carbon dioxide laden bed is regenerated thermally at considerably longer time intervals. While there are certain benefits to this arrangement, the plant costs are high due to duplication of columns and the need for additional equipment to carry out both systems of regeneration of the respective beds.

Wenning ("Nitrous oxides in Air Separation Plants" U. Wenning, Proceedings from MUST 96, pp 79-89) describes how carbon dioxide can displace already adsorbed nitrous oxide from a zeolite adsorbent, causing breakthrough of nitrous oxide at a concentration greater than that in ambient air.

U.S. Pat. No. 5,919,286 teaches that a layer of zeolite at the product (downstream) end of an alumina bed can be used for nitrogen oxides removal in a PSA process.

EP0992274 describes a process for the removal of carbon dioxide, water and nitrous oxide from air preferably in a TSA process, in which a three-layer adsorbent bed is used, with a first layer, for example of alumina, primarily adsorbing water, a second layer, for example of 13X, primarily adsorbing carbon dioxide, and a third layer, for example of CaX, primarily adsorbing nitrous oxide.

U.S. Pat. No. 5,846,295 describes a TSA process for the removal of $CO_2$ and $H_2O$ in which impregnated alumina is used, in some cases in combination with a zeolite such as 13X at the product end of the bed.

U.S. Pat. No. 5,614,000 describes a process for removal of water and $CO_2$ from air in which an adsorbent bed, preferably containing only alumina, may be regenerated partially by TSA and partially by PSA, with the part of the adsorbent that adsorbs water (the upstream part) being regenerated by PSA whereas the remainder is regenerated by TSA using a regenerating gas temperature of around 70° C. Such a process is known by the acronym TEPSA.

U.S. Pat. No. 5,855,650 describes a process for removal of water and $CO_2$ from air in which an adsorbent bed containing a layer of alumina and a layer of 13X zeolite, or a single layer bed entirely of alumina, is regenerated by TSA using a gas temperature of around 100° C. in the downstream part, whereas the upstream part on which water is adsorbed is regenerated partly by TSA and partly by PSA. Such a process is known by the acronym TPSA.

The selectivity for one gas compared with that for another gas exhibited by an adsorbent can be expressed as the ratio of the Henry's Law constants (initial isotherm slopes) for the two gases at 30° C.

BRIEF SUMMARY OF THE INVENTION

The present invention aims to provide a method of removal of high levels of water, carbon dioxide and nitrous oxide, and preferably also hydrocarbons such as propane, ethylene, propylene, acetylene and/or butane, present in ambient air.

It is a further aim of the present invention to provide a method whereby the level of breakthrough of the nitrous oxide and, where present, hydrocarbons is related to the carbon dioxide level breaking through the adsorbent, such that ensuring that the carbon dioxide level downstream of the bed is below a desired threshold ensures that the level of the nitrous oxide, and, where present, hydrocarbons, is also below a desired threshold.

It is a further aim of the present invention to avoid the use of highly water-sensitive adsorbents such as CaX. As the capacity of CaX is a very strong function of water loading, the use of this adsorbent requires great care to be taken in loading and operation to ensure that it does not come into contact with water.

The present invention provides a process for the reduction of the level of water, carbon dioxide and nitrous oxide in a feed air stream prior to cryogenic distillation, comprising:

a) passing said feed air stream at a feed temperature and a feed pressure in a feed direction through a first adsorbent, whose Henry's Law selectivity for $CO_2$ over $N_2O$ measured at 30° C. is at least 12.5, and subsequently through a second adsorbent, whose Henry's Law constant for the adsorption of $CO_2$ measured at 30° C. is less than 1020 mmol/g/atm and whose Henry's Law selectivity for $CO_2$ over $N_2O$ measured at 30° C. is at most 5;

b) ceasing after a first time period to pass said feed air stream to said first and second adsorbents;
c) depressurising the gas in contact with the first and second adsorbents to a second pressure lower than the feed pressure;
d) passing a heated regenerating gas at the second pressure and at a temperature which is between 20° C. and 80° C. to at least the second adsorbent in a direction opposite to the feed direction for a second time period, and subsequently passing a second regenerating gas at the second pressure and at a temperature less than the temperature of the heated regenerating gas to the first and second adsorbents in a direction opposite to the feed direction for a third time period;
e) ceasing passing regenerating gas to the first and second adsorbents;
f) re-pressurising the gas in contact with the first and second adsorbents to the feed pressure; and
g) repeating steps a) to f),
wherein the second adsorbent occupies from 25% to 40% by volume of the total volume of the first and second adsorbents, and wherein the temperature of the heated regenerating gas is from 10° C. to 60° C. higher than the feed temperature or the temperature of the second regenerating gas, whichever is the higher.

The first adsorbent and the second adsorbent may be provided in separate vessels, but preferably are provided as, respectively, upstream and downstream (with respect to the feed direction) layers of a single bed of adsorbent.

In order to ensure that $N_2O$ and $CO_2$ levels at the outlet of the second adsorbent remain below required levels based on a measurement of the $CO_2$ level at the outlet, the properties of the first and second adsorbents with respect to the three components $H_2O$, $CO_2$ and $N_2O$ must be balanced to ensure that $N_2O$ breakthrough occurs after, or at the same time as, $CO_2$ breakthrough. On a given adsorbent, the speed at which a component of the feed air stream moves through the bed is dependent on its strength of adsorption. Of water, $CO_2$ and $N_2O$, water is the most strongly adsorbed on alumina or zeolites, and thus moves very slowly through the adsorbent bed. $CO_2$ is less strongly adsorbed than water, but, on the adsorbents used in the present invention, more strongly adsorbed than $N_2O$. It is desired that at least some of the $CO_2$, as well as all of the $H_2O$, present in the feed air stream is adsorbed on the first adsorbent, and that the second adsorbent is used for the adsorption of $N_2O$ and the remaining $CO_2$, as well as any hydrocarbons present in the feed air stream. That being so, a first adsorbent having a high capacity for $CO_2$ and $H_2O$, and a Henry's Law selectivity for $CO_2$ over $N_2O$ measured at 30° C. of at least 12.5, is used. This allows $N_2O$ to travel rapidly through the first adsorbent as it is not strongly adsorbed thereon, and, it is believed, prevents $CO_2$ from displacing a pulse of $N_2O$ on breakthrough from the first adsorbent as insufficient $N_2O$ is adsorbed thereon for any pulse to cause a problematically high outlet concentration after the second adsorbent. Further, the first adsorbent must be capable of desorbing $H_2O$ and $CO_2$ under PSA conditions.

Preferably, said first adsorbent comprises activated alumina, as this adsorbent has a high water capacity, thus preventing water from coming into contact with the usually more water sensitive second adsorbent, and can simultaneously adsorb water and carbon dioxide by formation of bicarbonates on the alumina surface. More preferably, said first adsorbent comprises activated alumina impregnated with potassium carbonate. The impregnated alumina may be as described in U.S. Pat. No. 5,656,064 in which a starting alumina is treated with a basic solution having a pH of at least 9, e.g. a solution of $KHCO_3$, and drying at a temperature which is low enough (e.g. below 200° C.) to avoid decomposing the impregnant compound to a form which adsorbs $CO_2$ in such a manner that the compound does not regenerate under the intended regeneration conditions. Preferably, the pH of the impregnating solution is related to the zero point charge (ZPC) of the alumina according to the formula: pH≥ZPC−1.4, or more preferably: ZPC+2≥pH≥ZPC−1.4. The impregnant is preferably an alkali metal or ammonium hydroxide, carbonate, bicarbonate, phosphate or organic acid salt. More preferably, the impregnant is selected from the group consisting of $K_2CO_3$, $Na_2CO_3$, $KHCO_3$, $NaHCO_3$, NaOH and KOH. It is found that such impregnated aluminas have enhanced $CO_2$ uptake but that their capacity with respect to nitrous oxide is similar to that of unimpregnated aluminas.

Preferably, said first adsorbent layer comprises from 60% to 75% by volume, and more preferably 65% to 72% of the total volume of the first and second adsorbents.

The second adsorbent is provided in a quantity sufficient to adsorb the $N_2O$, and optionally also any hydrocarbon impurities, present in the feed air stream, plus sufficient carbon dioxide that carbon dioxide breakthrough occurs prior to, or at the same time as, the breakthrough of nitrous oxide and, if present, the hydrocarbon impurities. The second adsorbent is selected to have a high capacity for $N_2O$, and optionally also for the hydrocarbon impurities, in order that the size of the layer can be kept as small as possible, which is advantageous for reasons of cost, as the second adsorbent is generally significantly more expensive than the first adsorbent. The second adsorbent comprises from 25% to 40% by volume of the total volume of the first and second adsorbents, preferably 28% to 35% by volume, and most preferably 32% by volume, with lower values within each range generally being preferred for reasons of cost, where the $N_2O$ removal level of a given range is within acceptable limits for the intended application.

The length of the second adsorbent must be sufficient to contain all of the $N_2O$ present in the feed air stream supplied until breakthrough of $CO_2$ from the second adsorbent, plus the overflow of $CO_2$ from the first adsorbent, in order to prevent $N_2O$ breakthrough from the bed prior to $CO_2$.

The second adsorbent must also be able to desorb the $N_2O$, and where applicable also the hydrocarbon impurities, effectively under the chosen regeneration conditions. The present inventors have sought to provide a process that can function at a low regeneration temperature in order that the cost in terms of providing heaters in the apparatus and in terms of the power usage can be kept to a minimum. This requires the capacity of the second adsorbent for carbon dioxide to be balanced against the desired regeneration temperature to be used. If $CO_2$ and/or $N_2O$ is adsorbed too strongly on the second adsorbent, the second adsorbent will not be regenerated sufficiently at the chosen regeneration conditions. It has been found by the present inventors that CaX, taught for $N_2O$ removal under TSA regeneration at high temperatures, while having a high $N_2O$ capacity, is not able to desorb the $N_2O$ and $CO_2$ effectively under the regeneration conditions of the present invention. Similarly, it has been found by the present inventors that high capacity 13X zeolites, such as NaLSX with a Si/Al ratio of less than 1.15, and binderless zeolites are not suitable for use as the second adsorbent in the present invention. Therefore, said second adsorbent must have a Henry's Law constant for adsorption of $CO_2$ measured at 30° C. of less than 1020 mmol/g/atm. The present inventors have also found that alumina is not suitable for use as the second adsorbent, and therefore the second adsorbent has a maximum Henry's Law selectivity for $CO_2/N_2O$ measured at 30° C. of 5, and, preferably, a Henry's Law constant for adsorption of $CO_2$ measured at 30° C. of greater than 5.6 mmol/g/atm. Most preferably, said second adsorbent is selected from Na X zeolite with a Si/Al ratio of 1.15 or greater and 5A zeolite.

The Henry's Law constants have been measured at 30° C. for a number of adsorbents for $N_2O$ and $CO_2$, and the Henry's Law selectivity for $CO_2$ compared with $N_2O$ calculated, as set out in Table 1 below:

TABLE 1

| Adsorbent | $K_H CO_2$ (mmol/g/atm) | $K_H N_2O$ (mmol/g/atm) | Selectivity $CO_2/N_2O$ |
|---|---|---|---|
| Alcan AA-300 alumina | 5.6 | 0.45 | 12.5 |
| UOP 13X | 162 | 63 | 2.57 |
| UOP 5A | 145 | 54 | 2.69 |
| Binderless CaX | 1031 | 1035 | 1.00 |
| Na-mordenite | 366 | 185 | 1.98 |
| Ca-mordenite | 374 | 113 | 3.31 |
| CaX | 1020 | 503 | 2.03 |
| $K_2CO_3$-impregnated alumina (Alcan AA-320) | 22.8 | 0.42 | 54.3 |

It can be seen that both aluminas in the table above satisfy the preferred selectivity constraint for the first adsorbent, and that all of the adsorbents except CaX, binderless CaX and alumina satisfy the preferred $K_H CO_2$ and Henry's law selectivity for $CO_2/N_2O$ constraints for the second adsorbent.

It is desirable that the temperature of the air exiting the adsorbent bed is not significantly higher than the temperature of the feed air stream, as, in the cryogenic separation of air, the gas exiting the adsorbent bed is then passed to a heat exchanger for cooling. Mechanical problems with the heat exchanger may be experienced if the temperature of the air supplied to the heat exchanger exceeds about 70° C. It is possible under certain weather conditions for the feed air stream to be at a temperature of around 50° C. Preferably, therefore, the temperature of the gas immediately downstream of the adsorbent bed does not exceed 70° C. during the time for which the feed air stream is passed to the first and second adsorbents (the "on-line time"). Preferably, the temperature of the gas immediately downstream of the adsorbent bed exceeds the temperature of the feed air stream by a maximum of 15° C.

Surprisingly, the present inventors have found that running the adsorption cycle to carbon dioxide breakthrough as explained in the present invention does not, as might be expected from the teachings of Wenning, result in a pulse of nitrous oxide being displaced from the bed ahead of the carbon dioxide, but instead carbon dioxide and nitrous oxide breakthrough are found to be essentially simultaneous. Without wishing to be bound by theory, the present inventors propose that this may be because the regeneration conditions used in the present invention do not result in complete removal of the carbon dioxide adsorbed on the adsorbents, which may affect the mass transfer zone lengths for carbon dioxide and nitrous oxide on the adsorbents such that breakthrough of both components occurs approximately simultaneously. This behaviour is different from the reasons for which CaX is found to be a suitable adsorbent for $N_2O$ in a process in which high temperature thermal swing adsorption regeneration is used, which is attributed to the equal selectivity of CaX for $N_2O$ compared with $CO_2$.

Suitably, therefore, the method comprises measuring the concentration of $CO_2$ at the downstream end of the second adsorbent. Suitably, once a selected maximum $CO_2$ concentration is reached, the first and second adsorbents are regenerated. Suitably, the selected maximum $CO_2$ concentration is 100 ppb, preferably 50 ppb; as a practical matter the concentration of $CO_2$ must be at least 20 ppb in order to be detected. These values are time averaged $CO_2$ breakthrough concentrations.

Alternatively, the measurement of $CO_2$ concentration can be monitored from time to time only, rather than for every period of time for which the feed air stream is passed to the adsorbents, to set a fixed time for which the feed air stream is passed to the first and second adsorbents prior to regeneration, which fixed time is reviewed and altered if necessary in response to a subsequent measurement of $CO_2$ concentration.

Suitably, the time for which the feed air stream is passed to the first and second adsorbents prior to regeneration is from 20 min to 120 min, preferably from 30 min to 60 min. Suitably, the feed air stream is passed to the first and second adsorbents at a feed temperature of from 10° C. to 70° C., preferably from 20° C. to 60° C. Suitably, the feed pressure is from 2 bara (200 kPa) to 50 bara (5000 kPa), preferably from 3 bara (300 kPa) to 30 bara (3000 kPa), and more preferably from 4 bara (400 kPa) to 20 bara (2000 kPa).

Periodic regeneration preferably takes place while a second set of the first and second adsorbents is used to continue the purification process, each set of the two adsorbents being on-line in the purification process and being regenerated in alternation.

Preferably, the regeneration of the first and second adsorbents comprises passing heated regeneration gas (purge gas) countercurrently through the second and first adsorbents for a period of from 2 min to 30 min, preferably 5 min to 30 min, more preferably 10 min to 20 min. The purge gas temperature must be 10-60° C. higher than the feed gas temperature or the temperature of the second, cooler, regenerating gas, whichever is the higher, and is preferably 10-35° C. higher, and more preferably 20-35° C. higher, than the feed gas temperature or the temperature of the second, cooler, regenerating gas, whichever is the higher. In addition, the temperature of the heated gas is from 20° C. to 80° C., preferably not exceeding 70° C., more preferably from 20° C. to 70° C., and most preferably from 40° C. to 70° C. Subsequently, the regeneration comprises passing a second regenerating gas at a temperature within the range given above for the feed temperature, but cooler than that of the heated gas temperature used, countercurrently through the second and first adsorbents. Preferably, the second regenerating gas has a temperature not more than 5° C. higher than the feed temperature. Suitably, the second regenerating gas may be passed to the adsorbents for a period of from 10 to 40 min, preferably from 15 to 30 min. Regeneration gas must not contain water, carbon dioxide, nitrous oxide, or, where hydrocarbons are to be removed from the feed air stream, hydrocarbons, and may suitably consist of $N_2$, $O_2$, CO, Ar, He, product air depleted in water and $CO_2$, and mixtures thereof. In a preferred embodiment, the regeneration gas would consist either of product $N_2$ or more preferably waste effluent from the $N_2$ plant (60% $O_2$/40% $N_2$). Preferably, the regeneration conditions selected result in regeneration of the second adsorbent by purge with the heated gas, that is, in a low temperature TSA type process, and regeneration of the first adsorbent by purge with the cooler gas, that is, in a PSA-type process, as this ensures sufficient desorption of $CO_2$ and $N_2O$ from the second adsorbent to result in an acceptable working capacity while minimising the energy requirements of the desorption, as alumina may be regenerated effectively under PSA conditions. However, if desired, the first adsorbent may also be wholly or partially regenerated by purge with the heated gas in a low temperature TSA type process.

In order to result in regeneration of the adsorbents, it is necessary to supply to the adsorbents in step d) a total volume of regenerating gas that is greater than the volume of the feed air supplied to the adsorbents in step a). Suitably, the total volume of regenerating gas used is at least 1.2 times the volume of the feed air supplied during step a), and, suitably, up to a maximum of 4 times the volume of the feed air supplied during step a). The present invention uses a molar ratio of regenerating gas to feed gas of less than 1, and therefore the pressure of the regenerating gas used (the second pressure) is lower than the feed pressure. Suitably, the second pressure is from 0.5 bara (50 kPa) to 2 bara (200 kPa). Typically, the second pressure will be slightly above atmospheric pressure, such as 1.1-1.3 bara (110-130 kPa). Suitably, the molar ratio of regenerating gas to feed gas is from 0.2 to 0.8, preferably from 0.3 to 0.5, such as 0.45.

Suitably, the feed $CO_2$ concentration is from 100 to 1000 ppm, preferably 300 to 600 ppm. Suitably, the feed $N_2O$ concentration is around 0.3 ppm.

Suitably, at least 82% of the $N_2O$ present in the feed air is removed by the method of the present invention, preferably at least 85% and more preferably 90%. That is, the $N_2O$ level is preferably reduced to at most 18% of its original level in the feed air stream, preferably at most 15% and most preferably at most 10%.

Where the feed air stream further comprises at least one hydrocarbon selected from the group consisting of ethylene, acetylene, butane, propylene and propane, the level of said at least one hydrocarbon is reduced by adsorption on the second adsorbent. Preferably, at least 60% of the or at least one of each hydrocarbon is removed by the method of the present invention, and preferably at least 75%, such as at least 85% and more preferably 90%. It has been found by the present inventors that the hydrocarbon(s) coadsorb on the second adsorbent with the $CO_2$ and $N_2O$ and that no additional second adsorbent need be provided to accommodate the hydrocarbon(s).

Suitably, the process further comprises a step of conducting cryogenic distillation of the purified air stream to separate a nitrogen-rich stream and/or an oxygen-rich stream.

In a second aspect, the present invention provides the use of an apparatus comprising, in an adsorbent bed, a layer of a first adsorbent, whose Henry's Law selectivity for $CO_2$ over $N_2O$ measured at 30° C. is at least 12.5, and a layer of a second adsorbent, whose Henry's Law constant for the adsorption of $CO_2$ measured at 30° C. is less than 1020 mmol/g/atm and whose Henry's Law selectivity for $CO_2$ over $N_2O$ measured at 30° C. is at most 5, wherein the second adsorbent occupies from 25 to 40% by volume of the total volume of the first and second adsorbents, to reduce the level of water, carbon dioxide and nitrous oxide in a feed air stream in a process in which at least the second adsorbent is regenerated by passing therethrough a heated regenerating gas, and wherein at least a part of the first adsorbent is regenerated by passing therethrough a second regenerating gas having a temperature cooler than that of the heated regenerating gas, wherein the heated regenerating gas has a temperature which is between 20° C. and 80° C. and which is from 10° C. to 60° C. higher than the temperature of the feed air stream or the second regenerating gas, whichever is the higher.

The apparatus used in the second aspect of the invention may suitably further comprise one or more of the following: an inlet to the adsorbent bed for feeding the feed air stream in a feed direction in contact with the adsorbents and an outlet for the feed gas, valves for controlling the flow of the feed air stream, valves for depressurising the gas in contact with the adsorbents to a lower pressure, and inlet to the adsorbent bed for supplying regeneration gas to the adsorbents in a direction opposite to the feed direction and an outlet for the regenerating gas, valves for controlling the flow of regenerating gas, a heater for raising the temperature of the regenerating gas, and a control system for controlling the valves and the heater. Suitably, the apparatus may be in accordance with that described with reference to FIG. 1 or FIG. 2.

All features described in connection with any aspect of the invention can be used with any other aspect of the invention.

BRIEF DESCRIPTION OF SEVERAL VIEWS OF THE DRAWINGS

The invention will be further described with reference to a preferred embodiment, as shown in the drawings in which.

DETAILED DESCRIPTION OF THE INVENTION

Figure 1:
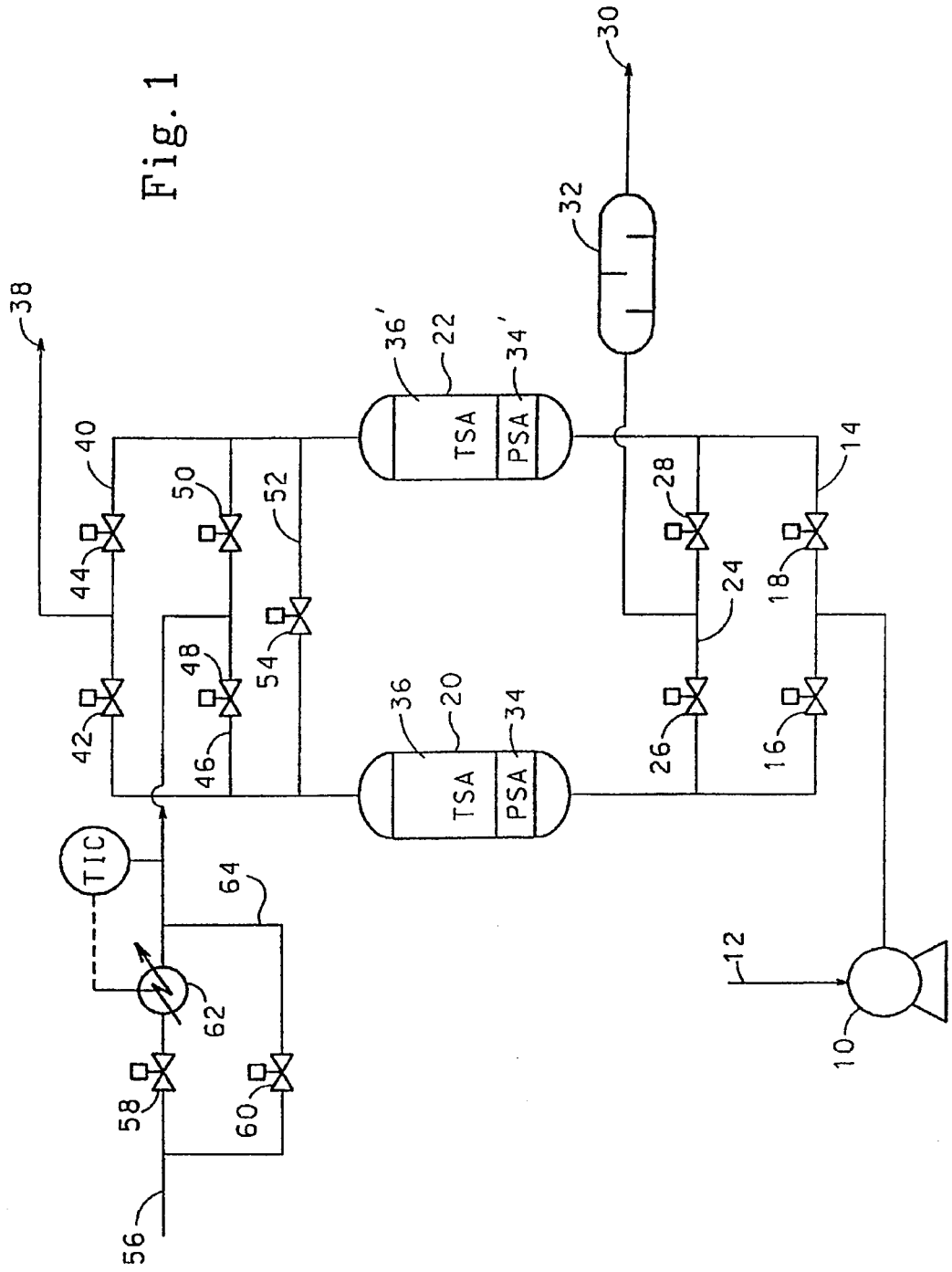
FIG. 1 shows an apparatus suitable for conducting the process of the present invention.

Referring to FIG. 1, this depicts schematically an apparatus suitable for conducting air pre-purification by the TEPSA method described in U.S. Pat. No. 5,614,000 and suitable for use in the present invention. Air to be purified is supplied to a main air compressor system 10 at an inlet 12 in which it is compressed by a multi-stage compressor with inter and after cooling by heat exchange with water. The cooled compressed air is supplied to an inlet manifold 14 containing inlet control valve 16 and 18 to which is connected a pair of adsorbent bed containing vessels 20 and 22. The inlet manifold is bridged downstream of the control valves 16 and 18 by a venting manifold 24 containing venting valves 26, 28 which serve to close and open connections between the upstream end of respective adsorbent vessels 20 and 22 and a vent 30 via a silencer 32. Each of the two adsorbent beds 20 and 22 contains at least two adsorbents. The feed end adsorbent (i.e. that at the upstream or inlet manifold end of the bed) is designated by the numeral 34, 34' in respective beds and the product end adsorbent (i.e. that at the downstream or outlet manifold end of the bed) by the numeral 36, 36'.

The apparatus has an outlet 38 connected to the downstream ends of the two adsorbent vessels 20, 22 by an outlet manifold 40 containing outlet control valves 42, 44. The outlet manifold 40 is bridged by a regenerating gas manifold 46 containing regenerating gas control valves 48 and 50. Upstream from the regenerating gas manifold 46, a line 52 containing a control valve 54 also bridges across the outlet manifold 40.

An inlet for regenerating gas is provided at 56 which through control valves 58 and 60 is connected to pass either through a heater 62 or via a by-pass line 64 to the regenerating gas manifold 46.

The operation of the valves may be controlled by suitable programmable timing and valve operating means as known in the art, not illustrated.

In operation, air is compressed in the main air compressor system 10 and is fed to the inlet manifold 14 and passes through one of the two vessels containing adsorbent. Starting from a position in which air is passing through open valve 16 to adsorbent vessel 20, and through open valve 42 to the outlet 38, valve 18 in the inlet manifold will just have been closed to cut off vessel 22 from the feed of air for purification. Valve 44 will just have closed also. At this stage valves 48, 50, 54 and 26 are closed. Bed 20 is thus on line and bed 22 is to be regenerated.

Air to be purified enters the feed end of bed 20, and water and carbon dioxide from the air is adsorbed on to the adsorbent 34. The bed 20 is designed such that water will not be adsorbed on to the downstream adsorbent 36, as this adsorbent is a water-sensitive zeolite, and so the length of upstream adsorbent (alumina) 34 is selected such that the mass transfer zone for water never extends beyond the boundary between adsorbent 34 and adsorbent 36 during normal operation. Some of the $CO_2$ is to be adsorbed on the upstream adsorbent 34 also, and the remainder of the $CO_2$ will be adsorbed along with the $N_2O$ and any hydrocarbons on the downstream adsorbent 36. The concentration of $CO_2$ exiting the adsorbent 36 may be measured, either at each on-line phase of bed 20, or from time to time to determine whether the time period for which the bed remains online results in an acceptable CO2 breakthrough level. Once the $CO_2$ concentration measured reaches a selected threshold, or the set time period has elapsed, the valve 16 is closed in order to shut off further feed air from passing through bed 20, and regeneration of the bed can commence as described for bed 22 below.

Regeneration of bed 22 takes place while bed 20 is online. To commence depressurisation of bed 22, valve 28 is opened and once the pressure in the vessel 22 has fallen to a desired level, valve 28 is kept open whilst valve 50 is opened to commence a flow of regenerating gas. The regenerating gas will typically be a flow of dry $CO_2$- and $N_2O$-free nitrogen obtained from the air separation unit cold box, possibly containing small amounts of argon, oxygen and other gases, to which the air purified in the apparatus shown is passed. Valve 60 is closed and valve 58 is opened so that the regenerating gas is heated to a temperature of, for example, 70° C. before passing into the vessel 22. Although the regenerating gas enters the vessel 22 at the selected elevated temperature, it is very slightly cooled by giving up heat to desorb nitrous oxide and some of the carbon dioxide from the upper, downstream adsorbent portion 36' in the vessel. Since the heat pulse is retained in the system, the exit purge gas emerges from the vent outlet in a cooled state. Progressively, a heat wave moves through the upper adsorbent 36' as the nitrous oxide and, to some extent, the carbon dioxide is cleared. After a desired period, whilst the heat pulse is part way through the upper adsorbent 36', valve 58 is closed and valve 60 is opened so that the flow of regenerating gas now becomes cool. The cooled regenerating gas displaces the heat pulse further through the upper adsorbent 36'.

Whilst the upper adsorbent has been thus regenerated by TSA, the cool regenerating gas has continued to flow through the lower adsorbent and by virtue of its reduced pressure has desorbed water and carbon dioxide from the upstream adsorbent 34' by PSA. At the end of the allotted regeneration period, valve 50 may be opened to displace nitrogen from the adsorbent and, after the closing of valve 28, to repressurise the vessel 22 with purified air. Thereafter, valve 54 may be closed and valves 18 and 44 may be opened to put the vessel 22 back on line. Residual heat left in the bed may be removed by purified air as a temperature pulse which can be removed in a downstream heat exchanger. The vessel 20 may then be regenerated in a similar manner and the whole sequence continued with the vessels being online, depressurising, regenerating, repressurising and going back online in phased cycles of operation.

It should be noted that carbon dioxide is not completely desorbed from the downstream adsorbent 36'; i.e. some residual carbon dioxide will remain on adsorbent 36' when the bed is brought back on-line. It is thought that this is responsible for the ability to run this bed to carbon dioxide breakthrough without displacement of a pulse of nitrous oxide from the adsorbent and into the product stream.

The heat pulse during regeneration does not penetrate as far as the boundary of the portion of the adsorbent into which water is adsorbed. This will lie somewhere within the region 34, 34' below the boundary with the region 36, 36' shown in the drawings. The actual proportions of the regions 34, 34' and 36, 36' are dependent on the operating conditions e.g. feed pressure, feed temperature, cycle time and purge/air ratio.

Figure 2:
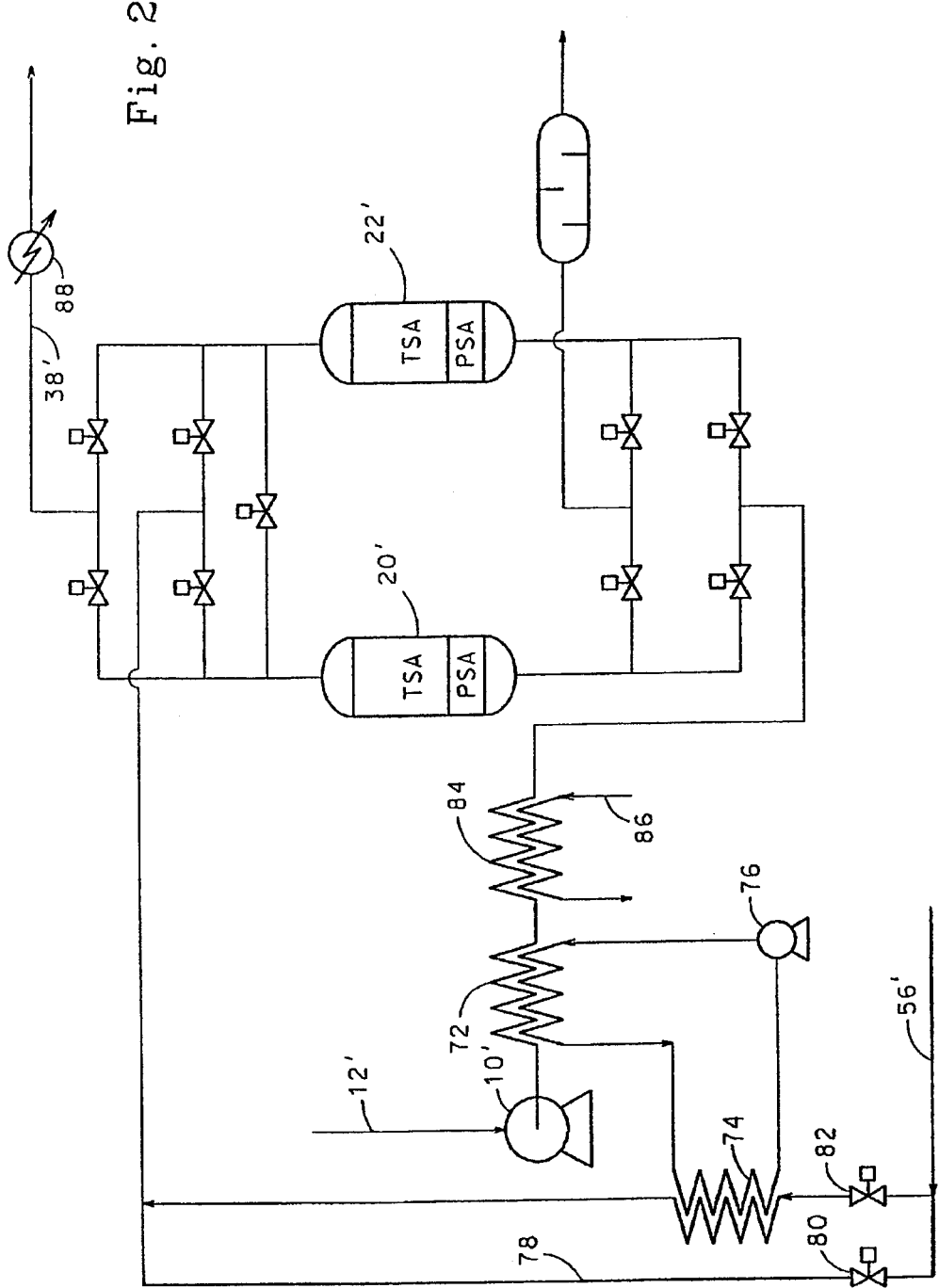
FIG. 2 shows an alternative apparatus suitable for conducting the process of the present invention.

In the variant of the apparatus shown in FIG. 2, the regenerating gas is heated by heat exchange with a closed loop water recirculation system. Air 12' compressed in the main air compressor system 10', which is at a high temperature due to the compression, is precooled before being introduced into the TEPSA beds 20', 22'. Heat is recovered from the compressed air in a two stage aftercooler comprising a first stage cooler 72 in which the compressed air is cooled with cooling water, which in turn is heat exchanged with purge nitrogen 56' from the air separation plant in a heat exchanger 74. Heat exchangers 72 and 74 form a closed water recirculation system with a water pump 76. A by-pass line 78 is provided for the purge gas around the heat exchanger 74 and flow through the line 78 and the heat exchanger 74 is controlled by valves 80 and 82 respectively. Any excess heat remaining in the compressed feed air may be removed in a second stage cooler 84 of the two stage after cooler 72, to which is provided a flow of cooling water 86. The purified air at outlet 38' is cooled by cooling water in a heat exchanger 88.

Suitable process conditions are set out in Table 2 below:

TABLE 2

| Process Conditions | Preferred | More Preferred |
|---|---|---|
| Online time | 20 to 120 min | 30 to 60 min |
| Purge/Air ratio | 0.2 to 0.8 | 0.3 to 0.5 |
| Feed CO$_2$ Concentration | 100 to 1000 ppm | 300 to 600 ppm |
| Heat pulse | 20 to 80° C. | 30 to 70° C. |
| Feed temperature | 10 to 70° C. | 20 to 60° C. |
| Hot purge duration | 5 to 30 min | 10 to 20 min |

Thus, one may employ a layered bed containing an upstream layer of alumina followed by a downstream layer of molecular sieve. The alumina section may be an enhanced alumina of the type which may be produced by impregnating approximately 5% to 10% by weight potassium carbonate on the alumina by treating the starting alumina with a potassium carbonate solution and drying at high temperatures of up to about 125° C. Such aluminas have a particularly high capacity for carbon dioxide.

It will of course be understood that the vessels 20, 20' and 22, 22' can each, if desired, be separated into smaller vessels arranged in series and references to "layers" of adsorbents above include arrangements in which the separate adsorbents are placed in separate vessels arranged in series.

EXAMPLES

Comparative Example 1

Optimum Bed Layering for N$_2$O Removal from Air by PSA

A single 2.5 cm (1 inch) diameter, 183 cm (6 feet) long column was used to measure performance of a pressure swing adsorption process to purify air saturated with water and containing 400 ppm CO$_2$ and 3 ppm N$_2$O to a time averaged CO$_2$ breakthrough level of 50 ppb CO$_2$ (99.988% CO$_2$ removal). Purge gas was supplied by pure N$_2$ in a cylinder at the feed temperature. The cycle steps were feed, depressurisation, purge and repressurisation. Various bed layering schemes were investigated and the percentage of N$_2$O removal from the feed air stream was determined at a time averaged breakthrough level of 50 ppb CO$_2$ in the PSA effluent. The PSA operating conditions are shown in Table 3 below:

TABLE 3

| | |
|---|---|
| Feed time | 10 min |
| Purge time | 8 min |
| Repressurisation time | 1 min |
| Depressurisation time | 1 min |
| Feed temperature | 22° C. |
| Feed pressure | 6.4 bara (640 kPa) |
| Purge/air ratio (molar basis) | 0.42 |
| Regeneration pressure | 1.30 bara (130 kPa) |
| Feed flow rate | 66 gmol/h (0.066 kmol/h) |

Figure 3:
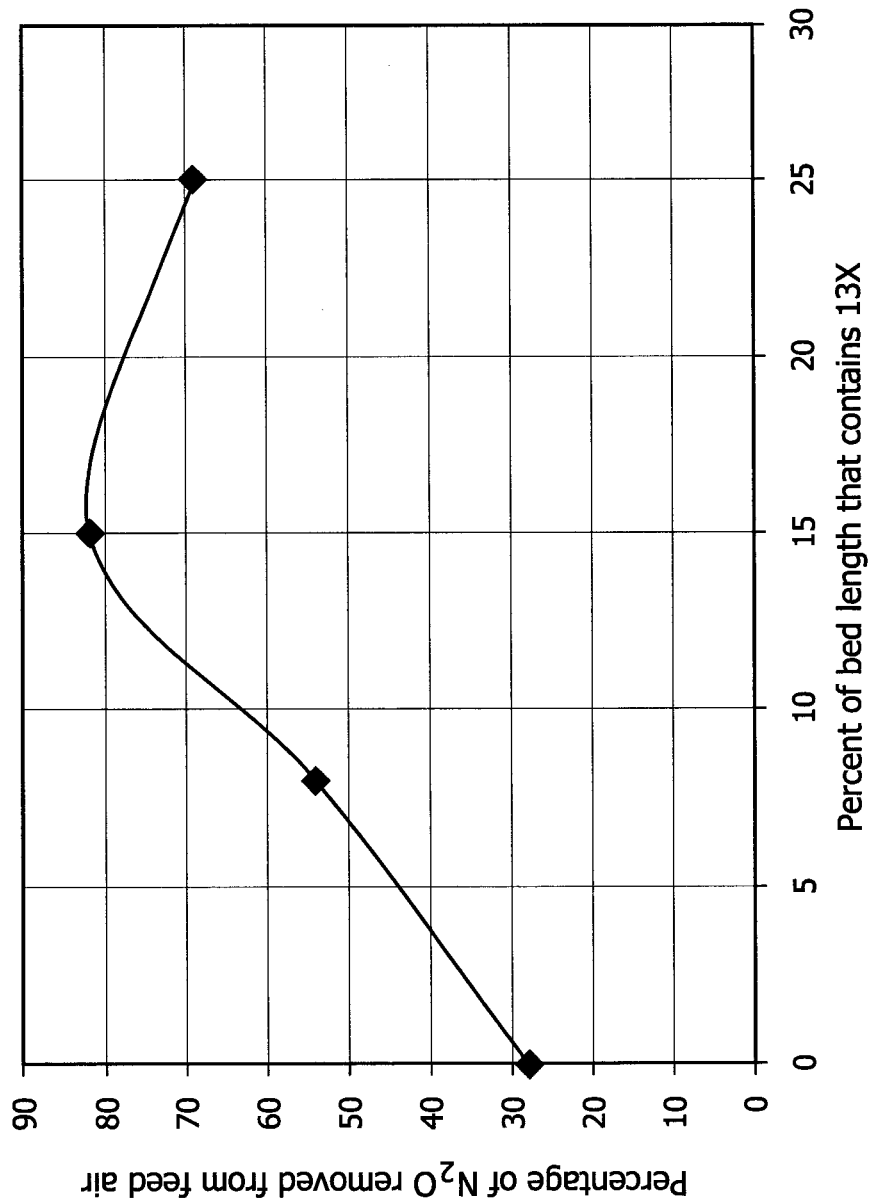
FIG. 3 shows the level of $N_2O$ removal in a PSA process as a function of the proportion of 13X zeolite in the adsorption bed.

Initially, the bed was filled with 8 x 14 mesh activated alumina (Alcan AA-300) and run until steady state PSA performance was attained with a time average CO$_2$ breakthrough of 50 ppb. Then the bed was loaded with various lengths of 13X zeolite (8×12 mesh Zeochem Z10-02, Si/Al=1.15) at the product (downstream) end of the bed and the extent of N$_2$O removal from the feed air was determined. The various bed lengths of 13X tested were 0, 8, 15 and 25% of the total bed length. FIG. 3 shows the extent of N$_2$O removal as a function of total bed length that contains 13X zeolite. The level of N$_2$O removal from the feed air was as shown in Table 4 below:

TABLE 4

| Percentage of 13X in bed | Percentage removal of N$_2$O |
|---|---|
| 0 | 28 |
| 8 | 54 |
| 15 | 82 |
| 25 | 69 |

This result shows that in PSA processing (no thermal regeneration) the optimal amount of bed length containing 13X zeolite is about 15% of the total bed length. As the 13X layer increases to 25%, a drop in N$_2$O removal was measured. Without wishing to be bound by theory, it is believed that this is because, as the layer of 13X becomes larger, significant quantities of CO$_2$ must be adsorbed on to the 13X once the alumina is saturated, and so the more weakly adsorbed N$_2$O is displaced from the zeolite and enters the product stream.

Comparative Example 2

N$_2$O Removal from Air in Two Layer Alumina/13X TSA Systems

CO$_2$ and N$_2$O breakthrough testing was carried out in the column described in Example 1. Tests were conducted with saturated air containing 400 ppm CO$_2$ and 0.3 ppm N$_2$O in the feed air at 7 bara (700 kPa) feed pressure and 22° C. feed temperature. The bed was loaded with activated alumina (Alcan AA-300) in the feed (upstream) end of the bed and 13X zeolite (Zeochem Z10-02) in the product (downstream) end of the bed. The ratio of alumina to 13X in the column was varied to determine the effect of 13X bed length on the level of N$_2$O removal at a CO$_2$ time averaged breakthrough level of 50 ppb. The percentage of the bed occupied by 13X was 100% (i.e. no alumina), 80% and 60%. Prior to the experiments, the column was regenerated in flowing N$_2$ at 200° C. for 8 h. The feed time in these experiments ranged from 8 to 10 h. These regeneration temperatures and feed times are representative of TSA systems.

Figure 4:
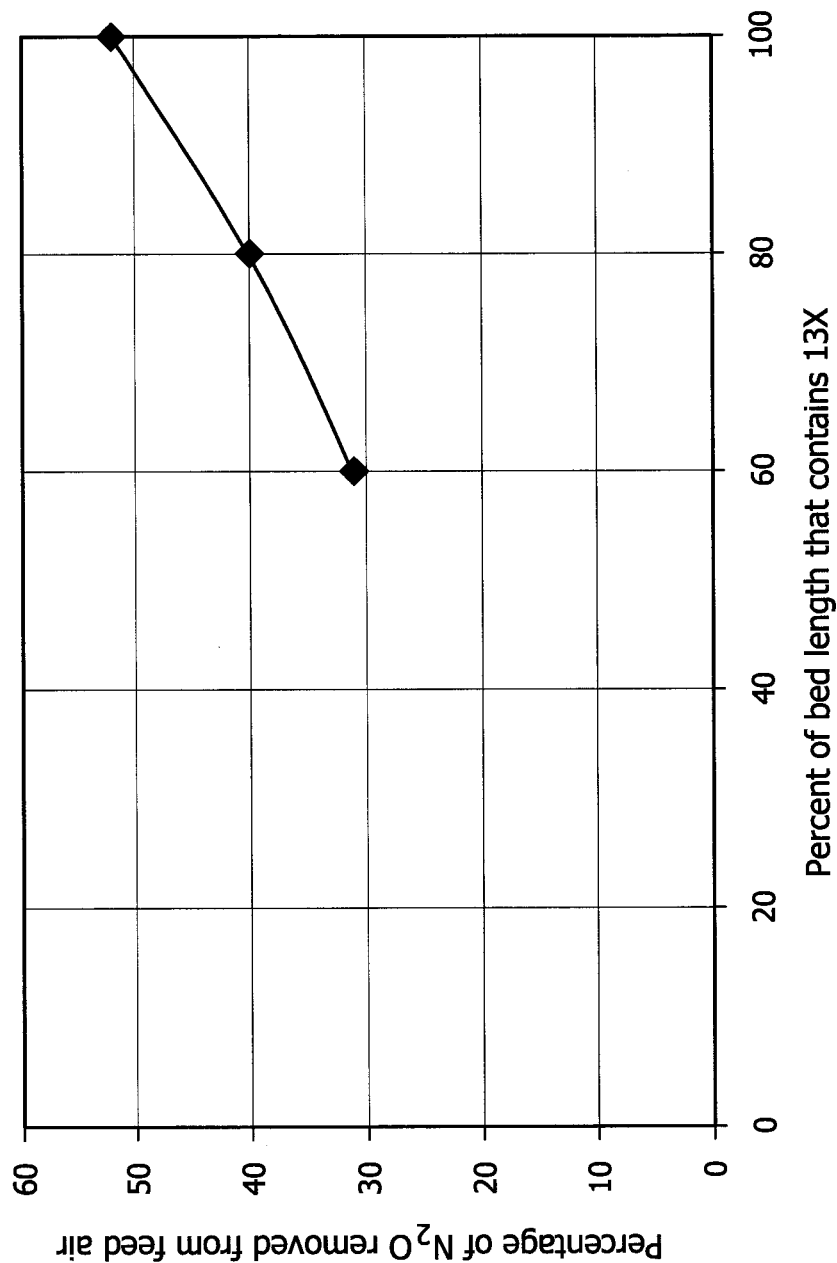
FIG. 4 shows the level of $N_2O$ removal in a TSA process as a function of the proportion of 13X zeolite in the adsorption bed.

The results of the breakthrough testing are shown in FIG. 4. The Figure clearly shows that as the percentage of the bed containing 13X increases, the extent of removal of N$_2$O from the feed air increases. It should also be noted that the highest N$_2$O removal percentage is only 52% with a bed containing 100% 13X zeolite. Beds containing 80% and 60% 13X zeolite removed 40% and 31% of the N$_2$O, respectively.

Comparative Example 3

Effect of CO$_2$ Breakthrough Level on N$_2$O Removal

A possible approach to preventing N$_2$O breakthrough from the adsorbent bed in a TSA process using 13X zeolite is to run the adsorption system well short of CO$_2$ breakthrough so the 13X layer can adsorb all of the ambient N$_2$O.

Using the column and experimental conditions described in Example 2 for the 80% 13X bed system, the level of N$_2$O removal on 13X was determined as a function of CO$_2$ breakthrough level. The regeneration temperature employed was 200° C. The relative reduction in feed time as a function of CO$_2$ breakthrough level and N$_2$O removal was determined.

The results of the testing are shown in Table 5 below. At a CO$_2$ breakthrough level of 100 ppb, the percentage of feed air N$_2$O removed is 28%. As the feed time is reduced by 17%, the time average CO$_2$ breakthrough is reduced to 50 ppb, and the N$_2$O removal is increased to 40%. If the feed time is further reduced to 58% of the original feed time, the CO$_2$ time average breakthrough level is only 1 ppb (99.9998% CO$_2$ removal) and the N$_2$O removal increases to 72%. Thus, limiting feed CO$_2$ breakthrough is a way to increase the level of N$_2$O removal, but at the expense of significantly reducing the feed time to the bed, which is undesirable, as it leads to a shorter on-line time for a given bed size, more frequent regenerations and increased power usage compared to a bed that is run to CO$_2$ breakthrough.

TABLE 5

| Time average CO$_2$ breakthrough (ppb) | Relative feed time | Percentage of feed air N$_2$O removal |
| --- | --- | --- |
| 100 | 1.0 | 28 |
| 50 | 0.83 | 40 |
| 1 | 0.58 | 72 |

Figure 5:
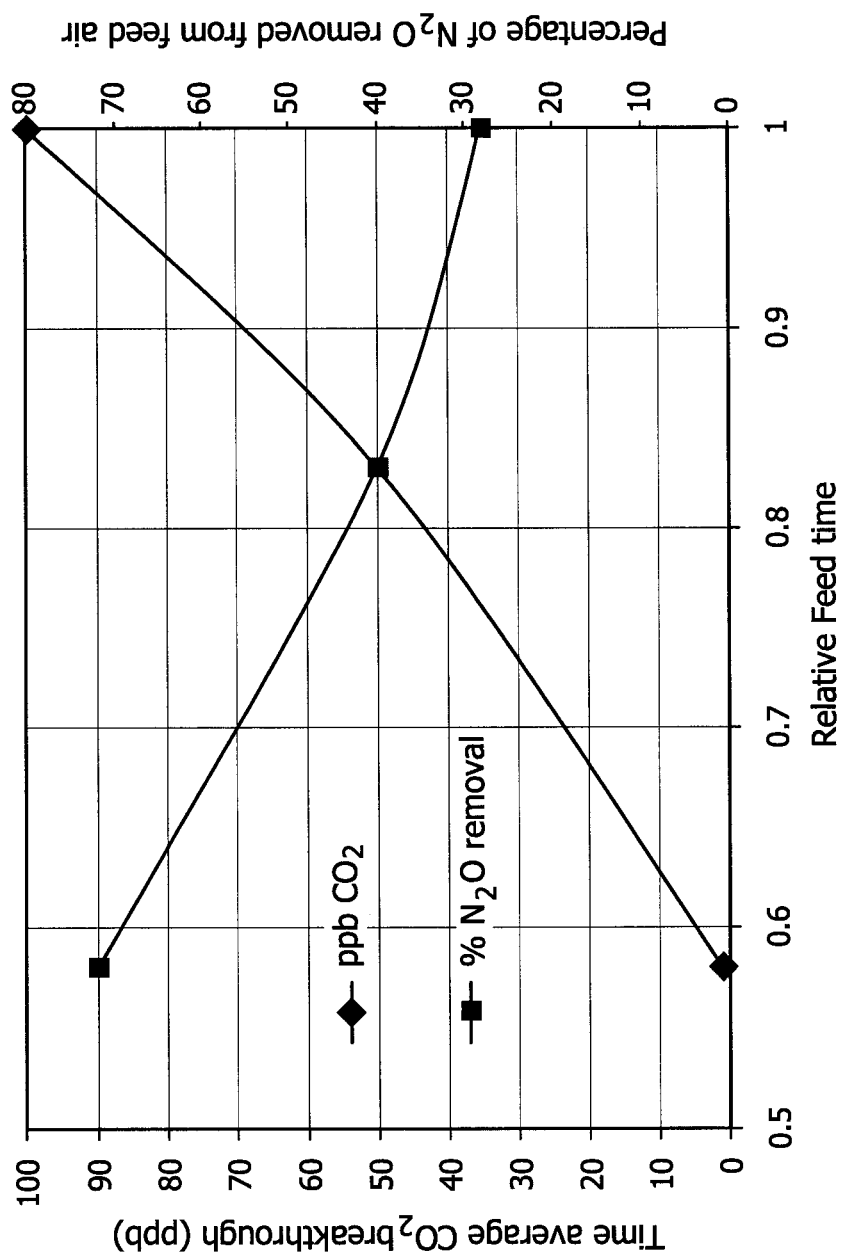
FIG. 5 shows the level of $N_2O$ removal and the time average $CO_2$ breakthrough in a TSA process as a function of the relative feed time.

FIG. 5 shows a plot of the effect of relative feed time on N$_2$O removal from feed air and the time average level of CO$_2$ breakthrough.

Example 4

Optimal Alumina/13X Bed Layering for Combined Low Temperature Thermal Swing and Pressure Swing Regeneration Two bed cyclic experiments for the removal of trace impurities from air were carried out in vessels 0.2 m in diameter. The length of the total adsorbent bed was 2 m. The feed air was saturated with water at feed conditions and contained 380 ppm CO$_2$ and 0.3 ppm N$_2$O. In all cases, the feed end of the adsorbent bed contained activated alumina (Alcan AA-300). Where present, the product end of the bed contained 13X zeolite (Zeochem Z10-02, Si/Al=1.15). The cycle tested is shown in Table 6 below:

TABLE 6

| | |
| --- | --- |
| Feed time | 35 min |
| Heat time at 70° C. | 10 min |
| Cool time at 36° C. | 19 min |
| Switch time (Depressurisation and repressurisation) | 6 min |
| Feed temperature | 36° C. |
| Feed pressure | 7.3 bara (730 kPa) |
| Purge/air ratio (molar basis) | 0.45 |
| Regeneration pressure | 1.25 bara (125 kPa) |
| Feed flow rate | 6.0 kmol/h |

The ratio of alumina to 13X in the adsorbent bed was varied and the average exit CO$_2$ breakthrough level was kept constant at 50 ppb. The resulting level of N$_2$O removed from the ambient air at that level of CO$_2$ removal was also measured. The results of varying the alumina/13X ratio are also shown in Table 7 below and FIG. 6:

TABLE 7

| Percentage of bed containing 13X zeolite | Percentage of N$_2$O removal from feed air |
| --- | --- |
| 0 | 9 |
| 15 | 48 |
| 25 | 82 |
| 32 | 92 |
| 45 | 75 |

Figure 6:
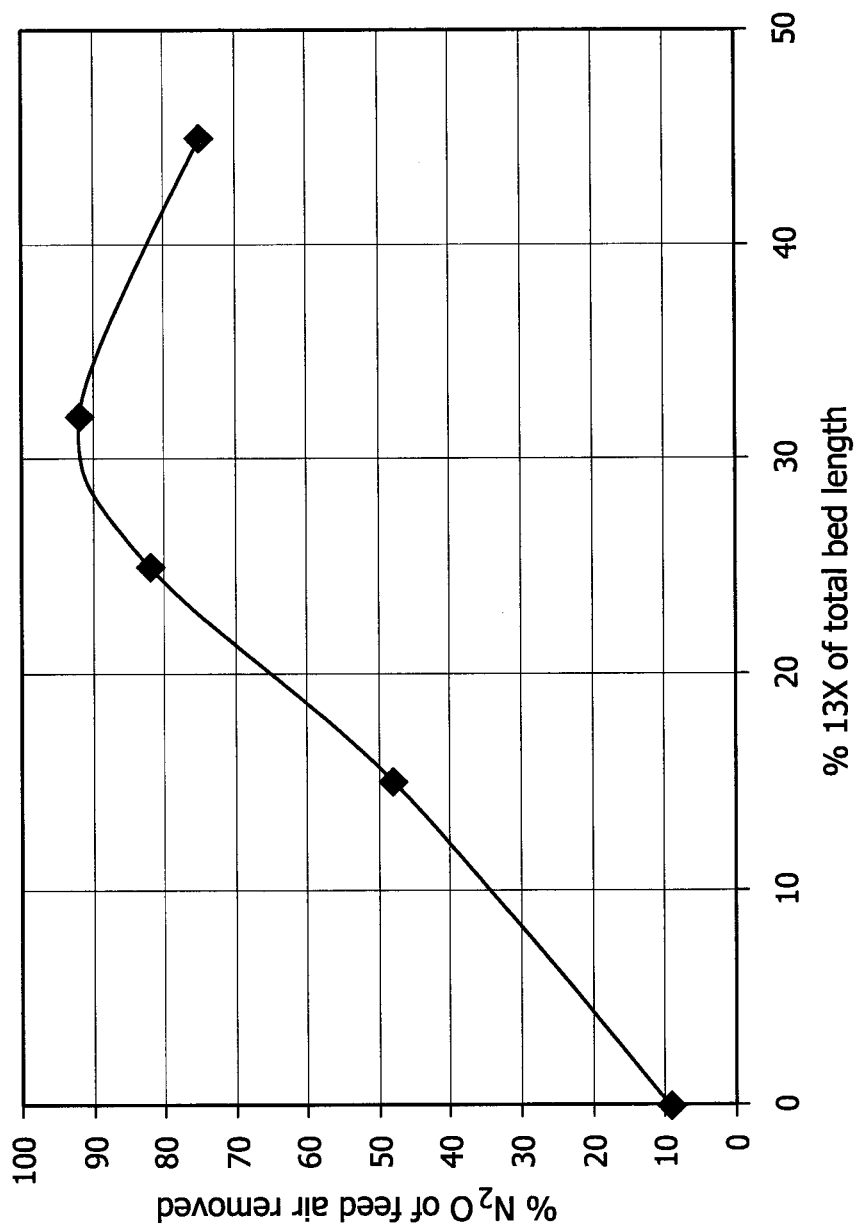
FIG. 6 shows the level of $N_2O$ removal in a TEPSA process as a function of the proportion of 13X zeolite in the adsorption bed.
Figure 7:
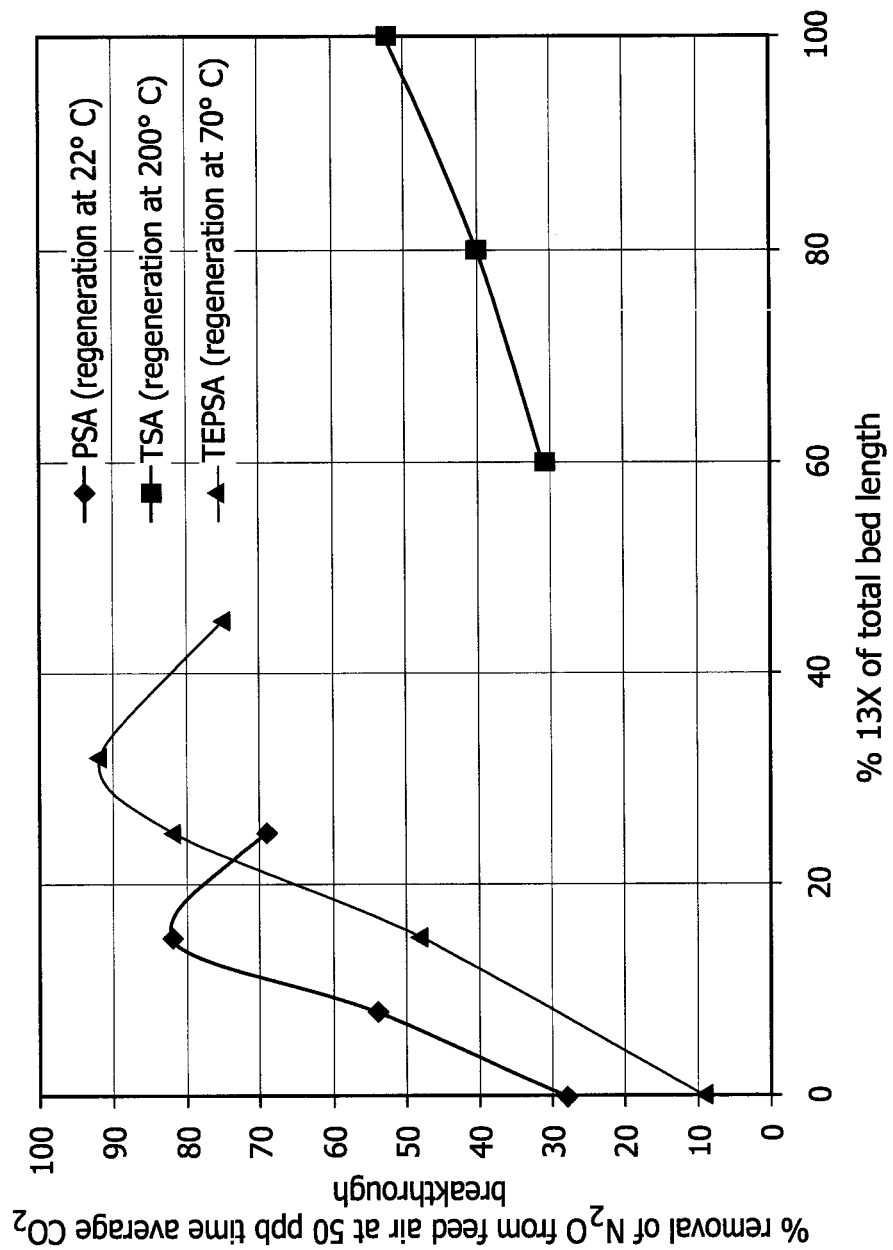
FIG. 7 shows the effect of regeneration temperature and proportion of 13X zeolite in the adsorption bed on the level of $N_2O$ removal.

The data presented in FIGS. 3, 4 and 6 can be re-plotted on the same graph (FIG. 7) and it can be seen therefrom that the optimum level of 13X zeolite required in the bed to obtain simultaneous high levels of CO$_2$ and N$_2$O removal is dependent on the regeneration temperature. In all these tests, the time average CO$_2$ breakthrough level was 50 ppb. In the case of the full TSA (regeneration at 200° C.), 13X is not capable of removing more than 60% of feed N$_2$O at 50 ppb CO$_2$ time average breakthrough, regardless of the percentage of the total bed that contains 13X. For the PSA process (regeneration at 22° C.), the optimum level of 13X required varies from 10% to 25% of the total bed volume. For intermediate regeneration gas temperature levels (e.g. 70° C.), the optimum percentage of 13X in the bed varies from 25% to 40% of the total bed volume for high removal of N$_2$O from the feed air.

The difference between PSA and the method of the present invention is the addition of a heat pulse. Surprisingly, when the present inventors added the heat pulse, it was possible to find an optimum 13X amount that gave equal or greater N$_2$O removal than for PSA. From FIG. 7, based on the TSA results, it was expected by the present inventors that the results in terms of $N_2O$ removal would be worsened by adding heat. However, it appears that the addition of a relatively small amount of heat improves $N_2O$ removal compared with PSA, but that the addition of a large amount of heat, such as in the case of TSA, makes it worse.

Example 5

Effect of Zeolite Type

The effect of zeolite type was investigated in the experimental unit described in Example 4. In place of the 13X zeolite, CaX zeolite (Ceca G586) and 5A zeolite (UOP KEG 410) were used. The CaX zeolite is 86% Ca exchanged X zeolite, and the 5A zeolite is 74% Ca exchanged A zeolite. Comparison experiments were conducted with bed loadings of 75% activated alumina (Alcan AA-300) and 25% zeolite.

Tests conducted with CaX as the final adsorbent layer were not successful. The average $CO_2$ content in the gas exiting the adsorption vessel never reached the 50 ppb time average target. It appears that CaX adsorbs $CO_2$ too strongly for this application. CaX has, however, been taught in the prior art as the preferred adsorbent for simultaneous $CO_2$ and $N_2O$ removal from ambient air in TSA applications where regeneration temperatures in excess of 80° C. are used.

In example 4, it was shown that when the bed contained 25% 13X zeolite, the level of $N_2O$ removal from the ambient air was 82% at a time average $CO_2$ breakthrough level of 50 ppb. The corresponding result obtained for 5A was 92%. This result shows that 5A is a good adsorbent for simultaneous removal of $CO_2$ and $N_2O$ from ambient air in low regeneration temperature TSA, for example TEPSA.

Example 6

Effect of Alumina Type

The experimental unit described in Example 4 was used, with the experimental conditions given in Table 8 below. In these two tests, the volumetric alumina/13X layering was kept at 75% alumina/25% zeolite, and in both cases the 13X zeolite used was Zeochem Z10-02. In one case unimpregnated alumina (Alcan AA-300) was used, and in the other impregnated alumina (Alcan AA-320 with 5 wt % $K_2CO_3$) was used. Time averaged $CO_2$ breakthrough level during these tests was 20 ppb.

TABLE 8

| | |
|---|---|
| Feed time | 35 min |
| Heat time at 70° C. | 10 min |
| Cool time at 50° C. | 15 min |
| Switch time (depressurisation and repressurisation) | 10 min |
| Feed temperature | 50° C. |
| Feed pressure | 5.0 bara (500 kPa) |
| Purge/air ratio (molar basis) | 0.50 |
| Regeneration pressure | 1.25 bara (125 kPa) |
| Feed flow rate | 3.4 kmol/h |

The results of the testing showed that the bed that contained the $K_2CO_3$-impregnated alumina had significantly higher $N_2O$ removal than the bed that used the unimpregnated alumina. The bed with the impregnated alumina demonstrated a $N_2O$ removal of 88%, whereas that for the unimpregnated alumina was 76%. The higher $N_2O$ removal for the impregnated alumina is likely to be due to the improved $CO_2$ capacity of this alumina relative to the unimpregnated alumina, which reduces the $CO_2$ challenge to the 13X and thus increases capacity for the $N_2O$ on the 13X.

The extent of hydrocarbon removal from the feed air was also determined in these experiments. The feed air contained 2 ppm of ethane, ethylene, propane, acetylene, butane and polypropylene. In all cases, ethylene, acetylene, butane and propylene were 100% removed from the feed air. Propane was 100% removed when $K_2CO_3$-impregnated alumina was used, whereas use of the unimpregnated alumina resulted in 93% propane removal. Both systems removed about 35% of the ethane.

Example 7

$N_2O$ and $CO_2$ Adsorption Properties on Alumina

The adsorption of $CO_2$ and $N_2O$ on various adsorbents was measured in a standard volumetric adsorption unit following initial thermal regeneration at 200° C. The corresponding Henry's Law constants were determined by fitting the linear portion of the low pressure adsorption data to a straight line after one adsorption and vacuum regeneration cycle. Subsequently, the Henry's Law selectivity was determined by the ratio of the two values. Table 9 gives the $CO_2/N_2O$ selectivity of various adsorbents at 30° C.:

TABLE 9

| Adsorbents | $CO_2/N_2O$ selectivity |
|---|---|
| Activated alumina (AA-300) | 12.5 |
| $K_2CO_3$ impregnated alumina (AA-320) | 54.3 |
| UOP 13X | 2.6 |

The results show that the $CO_2/N_2O$ selectivity on 13X is only 2.6, whereas those for the alumina-based materials are greater than 12.5. The high selectivity of the alumina based materials for $CO_2$ allows significant $CO_2$ adsorption on those materials, which ensures sufficient capacity for $N_2O$ and hydrocarbons on the zeolite final layer.

Example 8

Comparison of Preferred Conditions with those Taught in U.S. Pat. No. 5,885,650

The apparatus described in Example 4 was used, under the conditions shown in Table 10:

TABLE 10

| Process Conditions | Low feed time | Long feed time |
|---|---|---|
| Feed time | 50 min | 145 min |
| Heat time | 10 min at 60° C. | 32 min at 165° C. |
| Cool time | 33 min at 35° C. | 98 min at 35° C. |
| Switch time (depressurisation and repressurisation) | 7 min | 15 min |
| Feed temperature | 35° C. | 35° C. |
| Feed pressure | 8.9 bara (890 kPa) | 8.9 bara (890 kPa) |
| % $N_2O$ removal at 20 ppb time average $CO_2$ breakthrough | 95.9% | 32.6% at 20 ppb time average $CO_2$ breakthrough |
| Regeneration pressure | 1.05 bara (105 kPa) | 1.05 bara (105 kPa) |
| P/A (molar basis) | 0.3 | 0.3 |
| Feed flow rate | 4.1 kmol/h | 4.1 kmol/h |

In both experiments, the bed layering scheme was 75 vol % $K_2CO_3$ impregnated activated alumina (Alcan AA-320AP)

on the feed end of the bed and 25 vol % 13X zeolite (Zeochem Z10-02) on the product end of the bed. The results clearly show that the process conditions described in U.S. Pat. No. 5,855,650 with the longer feed time results in larger $N_2O$ breakthrough from the bed at a $CO_2$ exit concentration from the bed of 20 ppb.

Example 9

Temperature of Gas Exiting the Adsorbent Bed

The process described in Example 6 was used, and the temperature exiting the adsorption bed was measured for the bed containing Alcan AA-320 (75 vol %) and Zeochem Z10-02 (25 vol %). The maximum temperature exiting the bed during the on-stream time was 62° C. The average temperature exiting the bed was 54° C. Thus, the maximum temperature exiting the bed was 12° C. higher than the feed temperature. This low temperature rise is particularly important when a high feed temperature such as 50° C. is used, in order to prevent mechanical problems downstream in cryogenic distillation. The low temperature increase is ascribed by the present inventors to the low regeneration temperature of the process, and to the high proportion of alumina present in the adsorbent bed, as alumina does not adsorb significant amounts of oxygen or nitrogen during repressurisation.

Whilst the invention has been described with reference to a preferred embodiment, it will be appreciated that various modifications are possible within the scope of the invention.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

The invention claimed is:

1. A process for the reduction of the level of water, carbon dioxide and nitrous oxide in a feed air stream prior to cryogenic distillation, comprising:
    a) passing said feed air stream at a feed temperature and a feed pressure in a feed direction through a first adsorbent, whose Henry's Law selectivity for $CO_2$ over $N_2O$ measured at 30 C is at least 12.5, and subsequently through a second adsorbent, whose Henry's Law constant for the adsorption of $CO_2$ measured at 30° C. is less than 1020 mmol/g/atom and whose Henry's Law selectivity for $CO_2$ over $N_2O$ measured at 30° C. is at most 5;
    b) ceasing after a first time period to pass said feed air stream to said first and second adsorbents;
    c) depressurising the gas in contact with the first and second adsorbents to a second pressure lower than the feed pressure;
    d) passing a heated regenerating gas at the second pressure and at a temperature which is between 20° C. and 80° C. to at least the second adsorbent in a direction opposite to the feed direction for a second time period, and subsequently passing a second regenerating gas at the second pressure and at a temperature less than the temperature of the heated regenerating gas to the first and second adsorbents in a direction opposite to the feed direction for a third time period;
    e) ceasing passing regenerating gas to the first and second adsorbents;
    f) re-pressurising the gas in contact with the first and second adsorbents to the feed pressure; and
    g) repeating steps a) to f),
    wherein the second adsorbent occupies from 25% to 40% by volume of the total volume of the first and second adsorbents, and wherein the temperature of the heated regenerating gas is from 10° C. to 60° C. higher than the feed temperature or the temperature of the second regenerating gas, whichever is the higher.

2. The process of claim 1, wherein the first time period is from 30 to 60 min.

3. The process of claim 1, wherein the second time period is from 2 min to 30 min.

4. The process of claim 1, wherein the temperature of the heated regenerating gas is from 30 to 70° C.

5. The process of claim 1, wherein the third time period is from 10 to 40 min.

6. The process of claim 1, wherein the temperature of the second regenerating gas is not more than 5 C. higher than the feed temperature.

7. The process of claim 1, wherein the second adsorbent occupies from 28% to 35% by volume of the total volume occupied by the first and second adsorbents.

8. The process of claim 1, wherein the second adsorbent is selected from NaX zeolite having a Si/Al ratio of 1.15 or greater and 5 A zeolite.

9. The process of claim 1, wherein the first adsorbent is selected from alumina or impregnated alumina.

10. The process of claim 1, wherein the nitrous oxide level downstream of the second adsorbent is at most 18% of its original level in the feed air stream.

11. The process of claim 1, wherein the molar ratio of the heated regenerating gas and second regenerating gas supplied during step d) to the feed air supplied during step a) is less than 1.

12. The process of claim 1, wherein the second pressure is from 0.5 bara (50 kPa) to 2 bara (200 kPa).

13. The process of claim 1, wherein the feed pressure is from 2 bara (200 kPa) to 50 bara (5000 kPa).

* * * * *